Feb. 19, 1929.
P. P. KUCERA
1,702,476
JAR COVER
Filed July 29, 1924
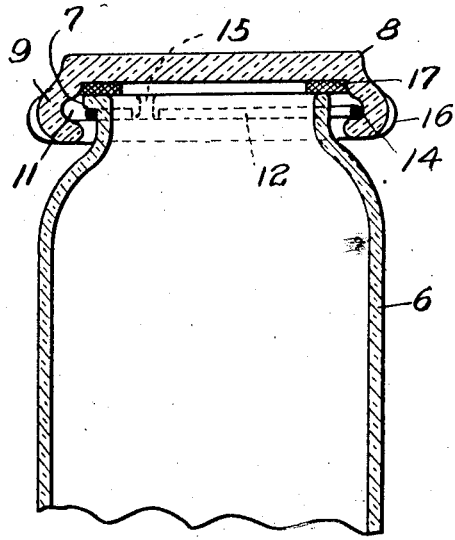
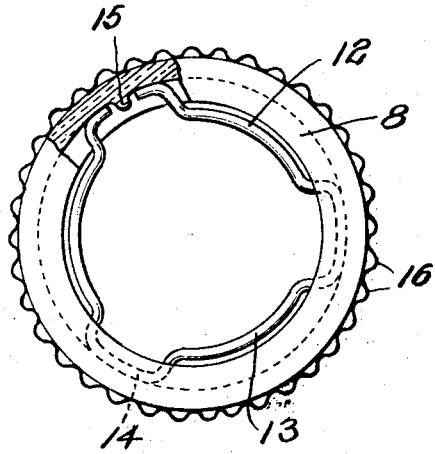
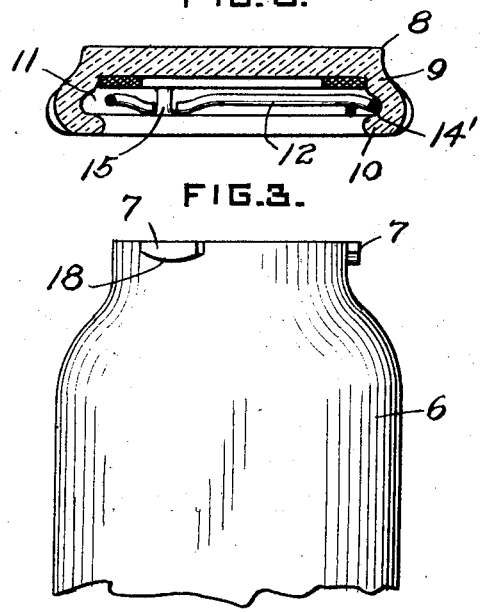
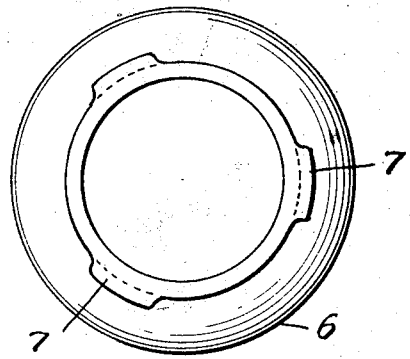
WITNESSES
J. Herbert Bradley
INVENTOR
Peter P. Kucera
By Green & McAllister
His Attorneys Patented Feb. 19, 1929.

1,702,476

UNITED STATES PATENT OFFICE.

PETER P. KUCERA, OF PITTSBURGH, PENNSYLVANIA.

JAR COVER.

Application filed July 29, 1924. Serial No. 728,855.

This invention relates to jars or containers and more particularly to an improved form of closure or cover therefor.

Jars used for preserving fruit and for similar purposes are generally made of glass for the reason that it neither affects the fruit or fruit juices nor is it affected by them. It is also desirable to have glass covers for the jars for the same reasons but this has hitherto been impossible for the reason that there has been no reliable way of securing a glass cover to the jar so as to insure the necessary air tight joint, while at the same time providing a device which can be used repeatedly without lessening its efficiency.

The well known Mason jar which has been universally used for the purposes set forth is provided with a metal cover having a screw threaded flange for securing it to threads formed on the jar and is also provided with a glass liner in the top so as to prevent metal coming in contact with the contents of the jar. This form of cover is not only relatively expensive but it can be used but once for all practical purposes, for the reason that the contents of the jar eventually work their way back of the glass liner and become a possible source of contamination of contents, if the cover is used a second time.

An object of this invention is to provide an improved form of cover for jars or containers which may conveniently be made of glass and which is provided with simple means for securing it in place on a jar or container.

A further object is to provide a device of the type set forth which can be easily cleaned and which may therefore be used repeatedly.

A still further object is to provide a glass cover for jars having a simple means for securing it in place and which is cheap to manufacture and positive and rugged in construction.

These and other objects which will be apparent to those skilled in this particular art are attained by means of this invention one embodiment of which is shown in the accompanying drawings, in which Figure 1 is a vertical section through a jar provided with a top constructed in accordance with this invention, Fig. 2 is a similar view of the top removed from the jar, Fig. 3 is a side elevation of a jar showing the securing lugs formed thereon, Fig. 4 is a bottom plan view, partially in section, of the cover and Fig. 5 is a top plan view of the jar.

The particular embodiment of this invention, chosen for the purposes of illustration, includes a jar which may, for example, be similar to a Mason jar, except that spaced lugs are provided at the top thereof instead of the usual screw threads. A cover or top is provided which has a downwardly extending, internally grooved flange which surrounds the top of the jar. A retaining means, such as the spring illustrated, is inserted in the groove and is adapted to engage the lugs of the jar for securely holding the cover in place thereof.

The drawings illustrate a jar 6 provided with a plurality of cover securing lugs 7 which are spaced around the top thereof. The cover 8 is preferably made of glass and has a downwardly extending flange 9, the bottom edge 10 of which is turned inwardly so as to provide an internal groove 11 adapted to receive a securing means which is illustrated as a snap spring 12. This spring 12 is provided with arched lug engaging sections 13 which are separated by outwardly extending cover-engaging sections 14 through which the lugs 7 of the container are adapted to pass upon application of the cover to the jar. The cover engaging sections 14 seat on the lower surface 14' of the groove 11. The lug engaging sections 13 extend inwardly beyond the confines of the groove 11 and are arched as shown in Fig. 2 so as to be flexed by engagement with the lugs 7 when the cover is in place on the jar resulting in the cover being pressed securely into position with a yielding pressure. The spring 12 is introduced into the groove 11 by flexing the spring so as to reduce its diameter sufficiently to permit it to pass within the lower edge of the groove after which it is snapped in place with its ends in position on opposite sides of the lug 15. Rotation of the spring 12 with relation to the cover 8 is prevented by means of a lug 15 which as stated is adapted to lie between the ends of the spring 12. The outer edge of the cover 8 is provided with a series of corrugations 16 to provide a gripping surface. A gasket 17 of any desired material, such as rubber, may be provided to insure an air tight joint between the jar and the cover.

However, the present type of securing means which permits the use of an all glass cover provides a structure in which the contacting surfaces of the cover and jar may be ground or lapped so as to provide a joint in which it is not necessary to use such a liner unless it is especially desired.

The cover is applied to the jar by passing the flange 9 downwardly around the upper edge or lip of the jar, after the cover is turned to such a position that the lugs 7 will pass through the outwardly extended sections 14 of the spring 12. The cover is then turned to move the lug engaging sections 13 of the spring under the surfaces 18 of the lugs 7 which surfaces are curved so as to flex the spring 12 between the sections 14 and thereby yieldingly hold the cover in place on the jar.

In preserving fruit the jars with their contents are heated and steam and air is driven off. In order to prevent air from entering the jar after the heating operation it is necessary with the Mason jar to tighten the cover in place while the jar is still hot at the end of the heating operation. The present invention eliminates any necessity for handling the heated jars. The steam and moisture will lift the cover 8 against the tension of the spring 12 sufficiently to allow the former to escape after which the spring 12 again returns the cover to an air tight seat on the jar, automatically preventing the admission of any air to the partially evacuated jar. The cover is held to its seat with a resilient pressure which not only insures an air tight joint but materially reduces breakage resulting from a jar or blow. The spring 12 can be easily removed or renewed, if necessary. The entire device can be cleaned as frequently as desired and may be used repeatedly.

Although I have described the use of lugs 7 for securing the cover in place other means, such as broken threads or grooves, may obviously be used in place of the lugs.

I claim:

1. The combination with a jar having lugs adjacent the top thereof, of a cover provided with a depending internally grooved flange adapted to surround the top of said jar, a spring seated in the groove of said cover and provided with yielding upwardly arched lug engaging sections positioned inwardly of said groove beyond the confines thereof for securing said cover to said jar and holding it in engagement therewith.

2. The combination with a jar of a cover therefor provided with an internal groove, a spring seated in said groove and provided with vertically arched sections formed in spaced relation to each other, said sections being positioned beyond the confines of said groove and means on said jar for engaging said sections so as to hold said cover in place.

3. The combination with a jar of a cover therefor provided with a depending internally grooved flange, a wire seated in said groove provided with upwardly extending sections formed in spaced relation to each other, said sections being positioned beyond the confines of said groove and means on said jar for engaging said upwardly extending sections so as to hold said cover in place with a downward pressure.

In testimony whereof, I have hereunto subscribed my name this 25th day of July, 1924.

PETER P. KUCERA.